(12) United States Patent
Bennett

(10) Patent No.: US 10,843,663 B2
(45) Date of Patent: Nov. 24, 2020

(54) WINDSHIELD WIPER SYSTEM WITH ACTIVELY MOVABLE PLATFORM

(71) Applicant: Faraday & Future Inc., Gardena, CA (US)

(72) Inventor: Nicholas Clyde Bennett, Los Angeles, CA (US)

(73) Assignee: FARADAY & FUTURE INC., Gardena, CA (US)

(*) Notice: Subject to any disclaimer, the term of this patent is extended or adjusted under 35 U.S.C. 154(b) by 0 days.

(21) Appl. No.: 15/638,271

(22) Filed: Jun. 29, 2017

(65) Prior Publication Data

US 2018/0141519 A1    May 24, 2018

Related U.S. Application Data

(60) Provisional application No. 62/356,348, filed on Jun. 29, 2016.

(51) Int. Cl.
| | | |
|---|---|---|
| *B60S 1/04* | (2006.01) | |
| *B60S 1/08* | (2006.01) | |
| *B08B 1/00* | (2006.01) | |

(52) U.S. Cl.
CPC .......... *B60S 1/0408* (2013.01); *B60S 1/0402* (2013.01); *B60S 1/043* (2013.01); *B60S 1/0405* (2013.01); *B60S 1/0452* (2013.01); *B60S 1/0463* (2013.01); *B60S 1/0818* (2013.01); *B08B 1/001* (2013.01)

(58) Field of Classification Search
CPC ........ B60S 1/0405; B60S 1/18; B60S 1/0402; B60S 1/043; B60S 1/0455; B60S 1/0452; B60S 1/0463; B60S 1/0408; B60S 1/0818

USPC ......... 15/250.16, 250.17, 250.19; 296/96.15, 296/96.17
See application file for complete search history.

(56) References Cited

U.S. PATENT DOCUMENTS

| | | | | | |
|---|---|---|---|---|---|
| 2,936,477 | A | * | 5/1960 | Feller | B60S 1/0405 15/250.19 |
| 4,283,085 | A | * | 8/1981 | Sacco | B60S 1/0405 15/250.16 |
| 4,783,876 | A | * | 11/1988 | Souma | B60S 1/0405 15/250.02 |
| 4,962,564 | A | * | 10/1990 | Onda | B60S 1/0405 15/250.19 |

(Continued)

FOREIGN PATENT DOCUMENTS

| | | | |
|---|---|---|---|
| DE | 4131597 | * | 4/1993 |
| DE | 4314435 | * | 11/1994 |

(Continued)

*Primary Examiner* — Gary K. Graham
(74) *Attorney, Agent, or Firm* — Veros Legal Solutions, LLP

(57) ABSTRACT

This disclosure relates to techniques for implementing a windshield wiper system with an actively movable platform. The windshield wiper system can include a windshield wiper arm mechanically coupled to a platform and an actuator mechanically coupled to the platform. The windshield wiper arm can be configured to move through a planar range of motion that is substantially parallel to a surface of a vehicle when the platform is positioned at a first spatial location and the movable windshield wiper arm can be configured constrained from moving through the planar range when the platform is positioned at a second spatial location.

16 Claims, 10 Drawing Sheets

(56) References Cited

U.S. PATENT DOCUMENTS 5,504,966 A * 4/1996 Lee ................. B60S 1/0405
15/250.16

FOREIGN PATENT DOCUMENTS

GB          2257900    *   1/1993
JP           5-105033    *   4/1993

* cited by examiner

900

```
┌─────────────────────────────────────────────────┐
│ Means for receiving indication to activate      │
│ windshield wiper system                         │
│ 902                                             │
└─────────────────────────────────────────────────┘
                         │
                         ▼
┌─────────────────────────────────────────────────┐
│ Means for causing movement of a windshield      │
│ wiper platform to a first spatial location      │
│ 904                                             │
└─────────────────────────────────────────────────┘
                         │
                         ▼
┌─────────────────────────────────────────────────┐
│ Means for causing movement of a windshield      │
│ wiper arm through a planar range of motion      │
│ 906                                             │
└─────────────────────────────────────────────────┘
                         │
                         ▼
┌─────────────────────────────────────────────────┐
│ Means for receiving an indication to stop       │
│ actuation of the windshield wiper arm           │
│ 908                                             │
└─────────────────────────────────────────────────┘
                         │
                         ▼
┌─────────────────────────────────────────────────┐
│ Means for causing movement of the platform to   │
│ a second spatial location                       │
│ 910                                             │
└─────────────────────────────────────────────────┘
```

*FIG. 9*

WINDSHIELD WIPER SYSTEM WITH ACTIVELY MOVABLE PLATFORM

CROSS-REFERENCE TO RELATED APPLICATIONS

This application claims the benefit of U.S. Provisional Application No. 62/356,348, filed Jun. 29, 2016, the entirety of which is hereby incorporated by reference.

FIELD

The described embodiments relate generally to techniques for implementing a windshield wiper system with an actively movable platform.

BACKGROUND

Windshield wiper systems can be used for windshields of automobiles and other vehicles. Windshield wiper systems can include a windshield wiper arm that can be movable through a planar motion across a windshield. The windshield wiper arm can include an elastomeric windshield wiper blade that can make physical contact with the windshield. As the windshield wiper blade moves across a windshield, it can push water, fluids, or other material aside. Windshield wiper systems may unduly impact the aerodynamic performance of a vehicle, decreasing fuel efficiency, top speed, and range. Furthermore, windshield wiper systems can become impacted by inclement weather. For example, freezing rain can negatively impact the ability of a windshield wiper system to clear a windshield. Additionally, windshield wiper systems can be aesthetically displeasing. Thus, there is need for improvement in the field of windshield wiper systems.

SUMMARY

This disclosure describes various embodiments that relate to techniques for implementing a windshield wiper system with an actively movable platform.

In certain embodiments, a windshield wiper system is disclosed, including a movable windshield wiper arm, a platform mechanically coupled to the movable windshield wiper arm, and an actuator mechanically coupled to the platform. The actuator can be configured to move both of the platform and the movable windshield wiper arm relative to a vehicle on which the windshield wiper system is installed. The movable windshield wiper arm can be configured to move through a planar range of motion that is substantially parallel to a surface of the vehicle when the platform is positioned at a first spatial location by the actuator. The movable windshield wiper arm can be further configured to be constrained from moving through the planar range of motion when the platform is positioned at a second spatial location by the actuator, the second spatial location differing from the first spatial location.

The platform can comprise a platform floor, wherein the platform floor is substantially flush with the surface when the platform is positioned at the first spatial location. The platform can comprise a platform floor and an applique, wherein the movable windshield wiper arm is spatially disposed substantially between the platform floor and the applique. The windshield wiper system can include a windshield wiper motor mechanically coupled to the movable windshield wiper arm, the windshield wiper motor configured to drive the movable windshield wiper arm to move through the planar range of motion. The actuator can be configured to move the platform in a substantially translational motion between the first spatial location and the second spatial location. The actuator can be configured to move the platform in a substantially rotational motion between the first spatial location and the second spatial location.

The windshield wiper system can further include a first sensor, the first sensor operable to detect whether the platform is positioned at the first spatial location. The windshield wiper system can further include a controller\ configured to cause the movable windshield wiper arm to move through the planar range of motion. The controller can be configured to: cause the movable windshield wiper arm to move to a first position in the planar range of motion from a second position on the platform; cause the movable windshield wiper arm to move through the planar range of motion from the first position, to a third position in the planar range of motion, and back to the first position; and cause the movable windshield wiper arm to move to the second position on the platform.

The windshield wiper can further include a controller configured to cause the actuator to move the platform and keep the platform stationary at the first spatial location, the second spatial location, or a third spatial location, the third spatial location being different from the first and second spatial locations. The windshield wiper system can further include a second sensor configured to determine precipitation incident upon the surface; and a controller coupled to the second sensor, the controller configured to cause the actuator to move the platform to the first spatial location from the second spatial location upon determining that the precipitation is incident upon the surface.

In certain embodiments, a device is disclosed, including a means for moving a platform between a first spatial position and a second spatial position, a windshield wiper arm mechanically coupled to the platform to move concurrently with the platform, wherein a portion of the platform forms a portion of the exterior of a vehicle when the platform is positioned at the second spatial location. The windshield wiper arm can be configured to move through a planar range of motion that is substantially parallel to a windshield of the vehicle when the platform is positioned at the first spatial location by the means to move the platform. The portion of the platform forming a portion of the exterior of the vehicle can be flush with an adjacent exterior portion of the vehicle when the platform is positioned at the second spatial location. The portion of the platform forming a portion of the exterior of the vehicle that can be flush with an adjacent exterior portion of the vehicle can be a portion of a windshield of the vehicle.

A drag coefficient of the vehicle can be reduced when the platform is positioned at the second spatial location and the drag coefficient of the vehicle is increased when the platform is positioned at the first spatial location. The draft coefficient can be measured correlating to airflow incident from a direction indicated by the front of the vehicle. The means for move the platform can be configured to move the platform between the first spatial location and the second spatial location within one second.

In certain embodiments, a method is disclosed, including causing, by a controller communicatively coupled to a windshield wiper system, an actuator of the windshield wiper system to move a platform between a first spatial location and a second spatial location, wherein the first spatial location is different from the second spatial location, and the windshield wiper arm is mechanically coupled to the platform. The windshield wiper arm can be configured to move through a planar range of motion that is substantially parallel to a windshield of the vehicle when the platform is positioned at the first spatial location by the actuator. The windshield wiper arm can further be configured to be constrained from moving through the planar range of motion when the platform is positioned at a second spatial location by the actuator.

The method can further include receiving, from a sensor, an indication that precipitation is incident upon the windshield. The method can also include, in response to the receiving the indication that precipitation is incident upon the windshield, causing the actuator of the windshield wiper system to move the platform from the second spatial location to the first spatial location. The method can additionally include determining whether precipitation is no longer incident upon the windshield and, upon determining that the precipitation is no longer incident upon the windshield, implementing a delay. The method can include, subsequent to the delay, causing the actuator of the windshield wiper system to move the platform from the first spatial location to the second spatial location. The method can include, upon receiving an indication to move the platform from the first spatial location to the second spatial location, moving the windshield wiper arm to be positioned upon the platform.

BRIEF DESCRIPTION OF THE DRAWINGS

The disclosure will be readily understood by the following detailed description in conjunction with the accompanying drawings, wherein like reference numerals designate like structural elements, and in which:

FIG. 9 illustrates an example flowchart for implementing features of certain embodiments.

DETAILED DESCRIPTION

Figure 1:
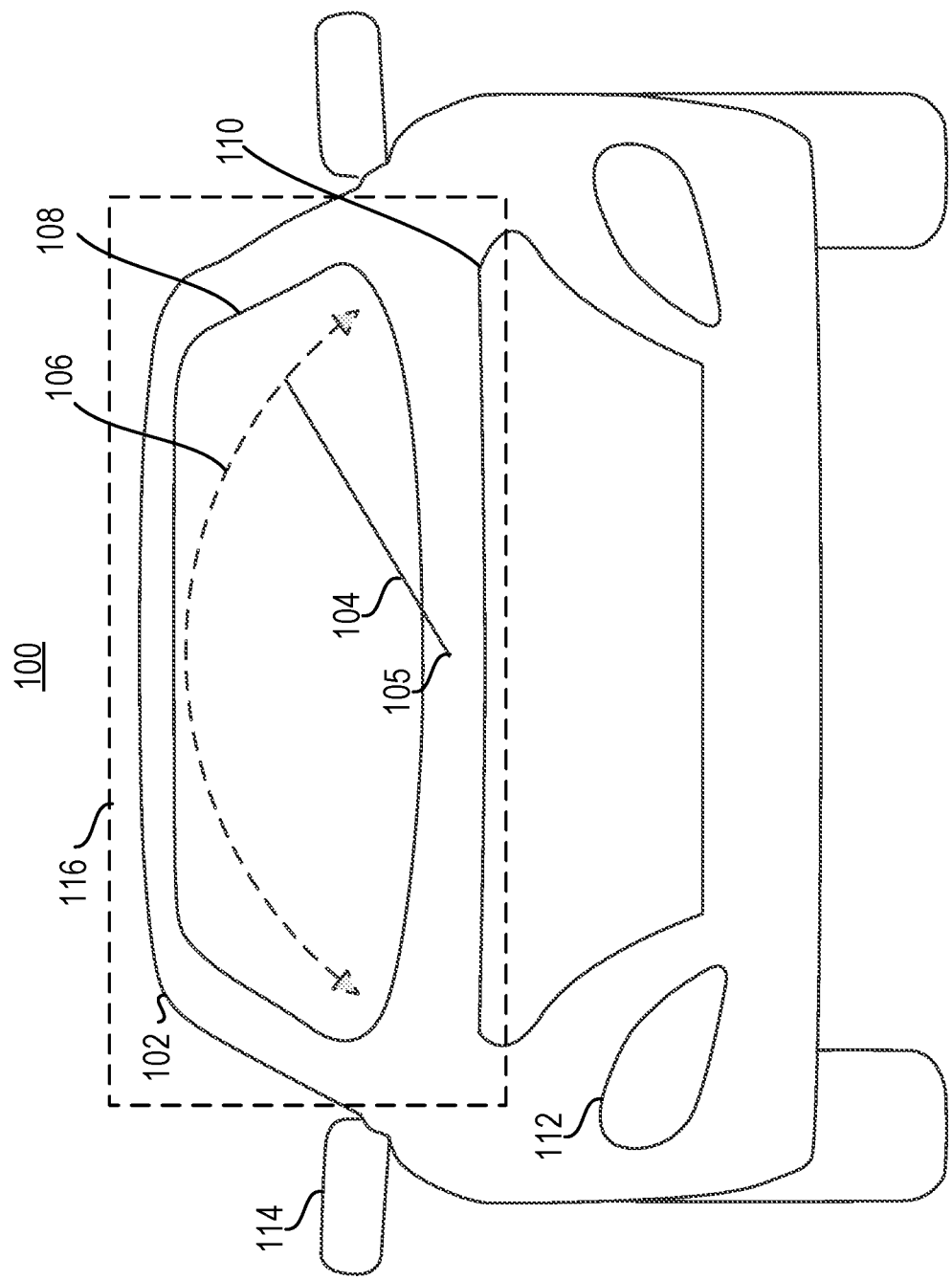
FIG. 1 illustrates an example vehicle with a traditional windshield wiper arm.

This description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the invention is not limited to the embodiments shown, but is to be accorded the widest scope consistent with the principles and features disclosed herein.

Windshield wiper systems can be employed by vehicles, such as automobiles, to clear fluid and debris from a windshield. A windshield can shield a driver (or other passengers) of a vehicle from oncoming air as well as debris that may otherwise impact a driver of a vehicle. A windshield may also be transparent to enable a driver to see outside of the vehicle as it travels. A windshield can be an important safety feature of a vehicle. If a windshield becomes covered by debris or precipitation, a user's ability to view the outside environment can become impacted. One method of clearing such debris from a windshield is through the use of a windshield wiper system.

A windshield wiper system can include a windshield wiper arm that travels through a planar range of motion. For example, the windshield wiper arm can pivot at a pivot point and move through an arc across a windshield. Alternatively, a windshield wiper arm can move laterally across a windshield instead of arcing at a pivot point. As the windshield moves across the windshield, it can push debris, water, snow, or other material off of the surface of a windshield, providing a less obstructed view to passenger(s) of a vehicle. Windshield wiper systems can include any number of windshield wiper arms and can be used on other surfaces or windows of a vehicle.

Windshield wiper systems can be mounted to the exterior of a vehicle, to allow the windshield wiper arm to move across an exterior surface of the vehicle. As such, a windshield wiper system can impact aerodynamics and aesthetics of a vehicle, for example. Furthermore, the operation of windshield wiper systems can be negatively impacted by inclement weather, such as freezing rain, for example. Freezing rain can form ice on contact with a windshield wiper arm or other components, impacting the ability of the windshield wiper system to clear material from a windshield. These effects are particularly apparent if a vehicle with a windshield wiper system is left stationary in inclement weather.

Disclosed herein are techniques for implementing windshield wiper systems that can include a movable platform. When the platform is in a first spatial position, the windshield wiper system can be operable to clear matter from the exterior of a windshield or other surface of a vehicle. When the platform is in a second spatial position, the windshield wiper system can be substantially hidden from view, forming an aesthetically pleasing and aerodynamic exterior profile of a vehicle. Additionally, the platform can shield windshield wiper arm(s) and blade(s) from negative effects of inclement weather by preventing precipitation from reaching these components with the platform is in the second spatial location. The platform can include an applique that hides the windshield wiper arm(s) when the platform is in the second spatial location while simultaneously shielding the windshield wiper arm(s).

FIG. 1 illustrates a vehicle 100 that includes a traditional windshield wiper arm 104. Windshield wiper arm forms a part of a windshield wiper system. Windshield wiper arm 104 is pivotally mounted 105 to the exterior 102 of vehicle 100. Windshield wiper arm 104 can move through arc 106 to form a planar range of motion that is parallel to windshield 108. As windshield wiper arm 104 moves across windshield 108, it can be operable to clear debris, precipitation, or other matter from windshield 108.

As illustrated, windshield wiper arm 104 can be pivotally mounted at a point 105 between hood 110 and windshield 108 of vehicle 100. When windshield wiper arm 104 is not moving through arc 106, it may be stowed on windshield 108. For example, when not in operation, windshield wiper arm 104 can be stored in a stationary position on the bottom portion of windshield 108. As such, windshield wiper arm 104 may, when stationary, impeded airflow flowing across exterior 102 of vehicle 100. Furthermore, windshield wiper arm 104 can be aesthetically displeasing and/or be negatively impacted by inclement weather, as disclosed herein, due to exposure to the environment of the vehicle.

Figure 2:
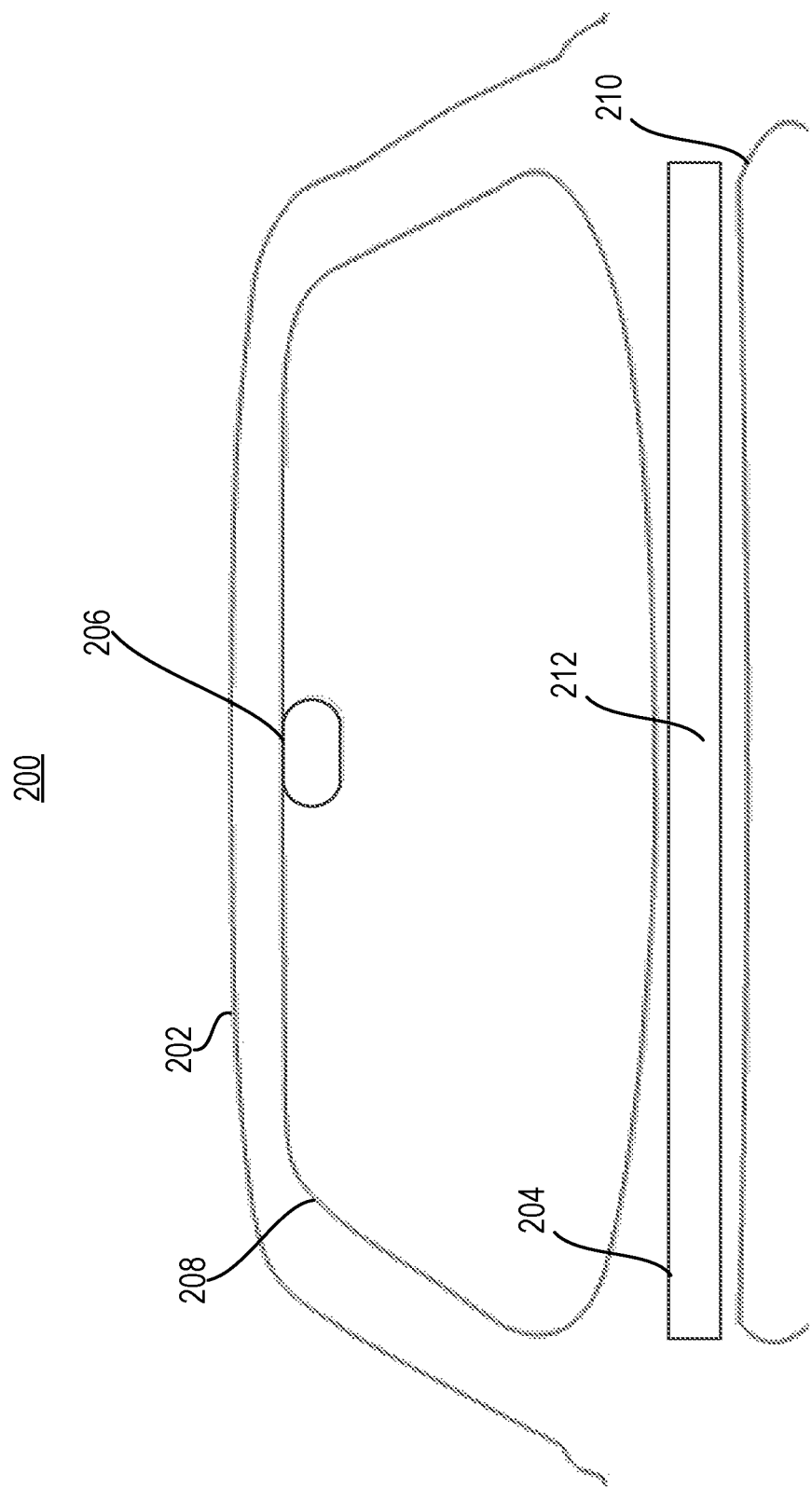
FIG. 2 illustrates a retracted windshield wiper system with active platform according to certain embodiments.

FIG. 2 illustrates a windshield wiper system according to certain embodiments. Illustrated is a view of a vehicle 200 that can be equated to dashed box 116 of FIG. 1. In FIG. 2, a windshield wiper system is implemented according to certain embodiments with a movable platform 204. Movable platform 204 is illustrated as being retracted into a spatial location that is substantially below the exterior surface 202 of vehicle 200. Movable platform 204 can include an applique 212 that is sculpted to match the surrounding exterior bodywork of vehicle 200. A windshield wiper arm (not shown), such as windshield wiper arm 104, can be coupled to platform 204 and positioned below applique 212. Applique 212 can hide windshield wiper arm when the platform is retracted, as illustrated, improving the aerodynamic and aesthetic properties of vehicle 200. Furthermore, applique 212 can serve to shield the windshield wiper arm from inclement weather while covering and concealing the windshield wiper arm.

Platform 204 can be positioned between windshield 208 and hood 210 of vehicle 200, as illustrated, or can be a positioned in various other positions. For example, platform 204 can be positioned on either side or above windshield 208. Platform 204 can be positioning in relation to other surfaces of vehicle 200, such as proximate to a different window (not shown), headlight (not shown), mirror (not shown), or other. Applique 212 can be sculpted and/or colored to substantially match surrounding exterior vehicle surface(s) depending upon, for example, an intended location of the platform on a vehicle.

Vehicle 200 can optionally include a sensor 206. Sensor 206 can, for example, include an imaging sensor operable to detect rain or other matter incident upon windshield 208. Sensor 206 can optionally include an infrared imager/detector, variable resistance sensor, or other sensor operable to detect matter incident upon windshield 208. Sensor 206 can be operable to detect an amount of precipitation incident upon windshield 208 to, for example, modify operation of a windshield wiper system. For example, the speed or frequency of a windshield wiper arm's movement can be regulated based upon input from sensor 206. As another example, actuation of platform 204 to extend or retract platform 204, as disclosed herein, can be triggered based upon input from sensor 206 indicating that precipitation is incident upon windshield 208.

Figure 3:
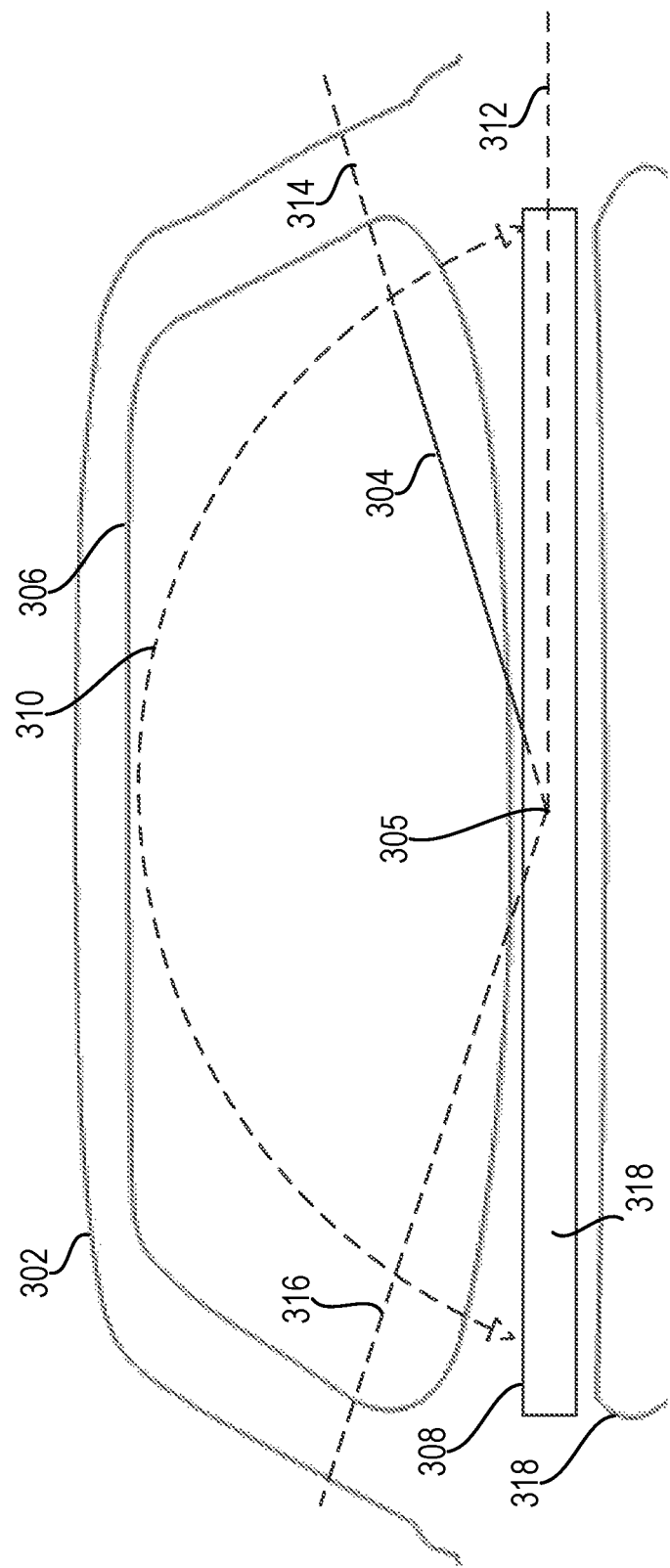
FIG. 3 illustrates an extended windshield wiper system with active platform according to certain embodiments.

FIG. 3 illustrates a vehicle 300 according to certain embodiments. Vehicle 300 is illustrated as including platform 308, which can be similar to platform 204. Platform 308 is illustrated as being located at a spatial location to enable windshield wiper arm 304 to travel through a planar range of motion 310 across windshield 306. A plane can be defined by the planar range of motion that continually extends in two dimensions. These two dimensions can be parallel to windshield 306. Also, windshield 306 may have some curvature. Therefore, the planar range of motion 310 may not be perfectly flat, because it follows the surface of windshield 306, including any curvature. Windshield wiper arm 304 can be pivotally coupled to platform 308 at pivot point 305. Windshield wiper arm 304 can be located between applique 318 and a floor of platform 308.

Windshield wiper arm 304 can travel between various positions around pivot point 305, for example. In certain embodiments, while platform 308 is retracted within exterior 302 of vehicle 300 or in motion, windshield wiper arm 304 can be caused to travel to position 312 such that is substantially located on platform 308. While in this stowed position, platform 308 can be actuated to move in relation to vehicle 302 without risking damage to windshield wiper arm 304. After platform 308 has fully extended to allow windshield wiper arm 304 to travel through the planar range of motion 310, windshield wiper arm 304 can be moved to position 314, for example. At position 314, windshield wiper arm 304 can be substantially located upon windshield 306, but substantially be located out of the primary field of view of a driver or passenger.

When windshield wiper arm 304 is caused to move through the planar range of motion 310, windshield wiper arm 304 can pivotally move between positions 314 and 316 across windshield 306 in order to push inclement matter off of windshield 306. For example, windshield wiper arm 304 can be caused to periodically move between positions 314 and 316 by a controller (not shown) based upon input from sensor 206, based upon a user selection, weather information, or other variables. After it is determined that windshield wiper arm 304 is no longer required to move between positions 314 and 316, windshield wiper arm can return to position 312 to enable platform 308 to retract into vehicle 302. This retraction can be determined after, for example, a predetermined delay after an indication is received that inclement matter is no longer incident upon on the windshield or a user preference to halt movement of windshield wiper arm 304 has been received.

Windshield wiper systems disclosed herein can include multiple windshield wiper arms (such as windshield wiper arm 304). Windshield wiper arm 304 can alternatively move laterally across a surface of vehicle 300, such as windshield 306. Furthermore, windshield wiper arm 304 can be mounted in various positions. For example, pivotal mount 305 can be located to either side of windshield 306, above windshield 306, or at other locations. Furthermore, a windshield wiper system is not limited for use on windshield 306. A windshield wiper system can include a windshield wiper arm moving across a different window of a vehicle (such as a rear window), a side view mirror 114, a headlight 112, or other surface of a vehicle. The windshield wiper system can include a fluid dispenser (not shown), fluid pump(s) (not shown), one or more actuators (not shown), windshield wiper blade(s) (not shown), or various other components.

Figure 4:
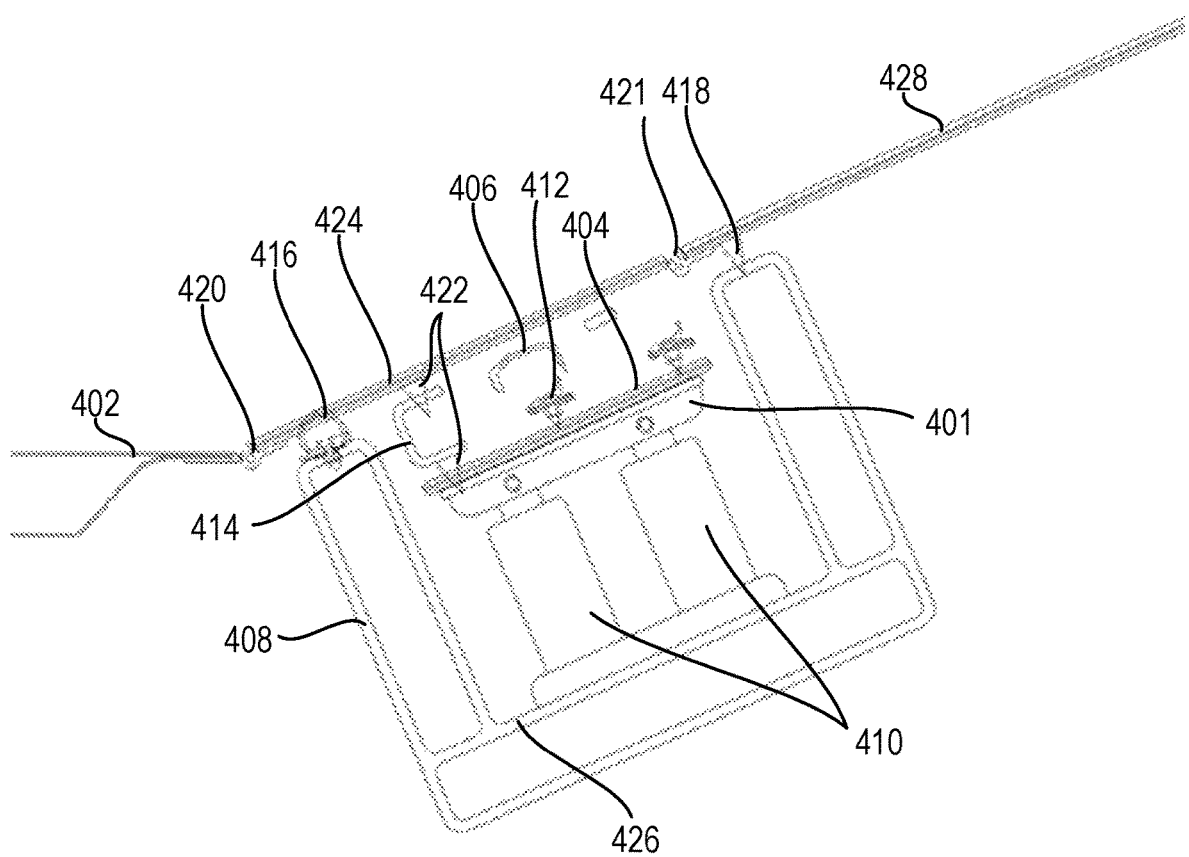
FIG. 4 illustrates a cutaway view of a retracted windshield wiper system with translational actuation according to certain embodiments.
Figure 5:
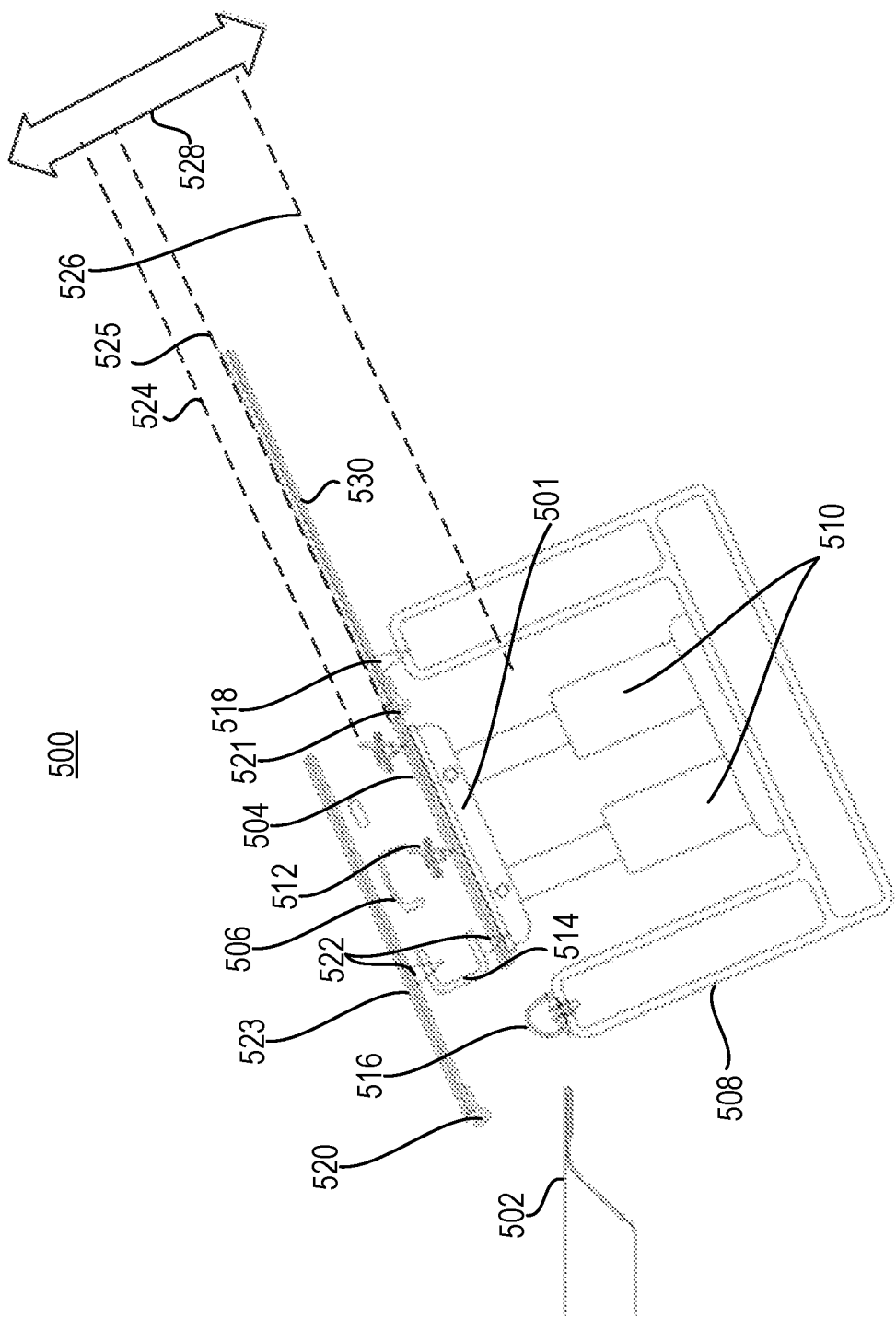
FIG. 5 illustrates a cutaway view of an extended windshield wiper system with translational actuation according to certain embodiments.

FIGS. 4 and 5 illustrates two different states of respective windshield wiper systems 400 and 500 that can be moved via translational actuation. Windshield wiper system 500 is illustrated as being extended to a spatial position to enable a windshield wiper arm to move across a windshield. Windshield wiper system 400 is illustrated as being retracted, such that a windshield wiper arm is below an exterior surface of a vehicle and can be constrained from moving across a windshield. Constraining movement of the windshield wiper arm can include physically confining the windshield wiper arm inside a cavity/recess so that the windshield wiper arm is physically restrained from moving. Constraining movement of the windshield wiper arm can also include not applying power or removing a physical coupling between a windshield wiper arm and corresponding actuator when the platform is retracted. In certain embodiments, constraining movement of the windshield wiper arm can include positioning the windshield wiper arm such that it does not move across a windshield or other exterior surface of a vehicle.

FIG. 4 illustrates a cutaway side profile of a windshield wiper system 400 with translational actuation according to certain embodiments. Windshield wiper system 400 includes platform 401 located between a windshield 428 and a vehicle exterior 402. Windshield wiper system 400 is illustrated as being located in a spatial location wherein windshield wiper arm 406 is constrained from moving through a planar field of motion across windshield 428. The position of platform 401 can be equated to the position of platform 204 illustrated in FIG. 2 or platform 308 in FIG. 3.

Windshield wiper system 400 includes actuators 410 coupled between vehicle structure 408 and platform 401. Actuators 410 can be configured to move platform 401 between two or more different spatial locations to enable platform 401 to extend, for example, in a direction substantially perpendicular to windshield 428. After platform 401 is extended, windshield wiper arm 406 can move through a planar field of motion across windshield 428. Actuators 410 can include linear or other actuators, such as hydraulic, electric, pneumatic, or other actuators.

Windshield wiper system 400 can include applique 424, which can be substantially parallel to windshield 428 when platform 401 is retracted and stowed within a vehicle exterior, as illustrated. Applique 424 can be made of fiberglass, carbon fiber, plastic, metal, or other materials and can be colored, opaque, or transparent. Applique 424 can be mechanically coupled to platform floor 404 via carrier 414 and bond flanges 422. As illustrated, windshield wiper arm 406 can be located between applique 424 and platform floor 404. Flip seals 420 and 421 can be configured to provide a weather and water resistant seal between applique 424, hood 402, and windshield 428 when platform 401 is retracted. Windshield wiper system 400 can also include primary seal 416 to further protect against fluid and weathering effects. Windshield wiper system 400 can include drainage openings 426 to allow a path for fluid to exit out of structure 408 and away from the vehicle.

Windshield wiper system 400 can include windshield wiper blade 412, which can be mechanically coupled to windshield wiper arm 406. The illustrated position of windshield wiper arm 406 can coincide with position 312 in FIG. 3. Windshield wiper system 400 can include additional windshield wiper arm(s) 406 that can also be coupled to platform 401. Furthermore, windshield wiper system 400 can include a windshield wiper arm actuator (not illustrated), a fluid dispensing nozzle (not illustrated), a fluid reservoir (not illustrated), a fluid pump (not illustrated), heating elements (not illustrated), or various other components associated with windshield wiper systems. These components can be fixedly mounted to platform 401 for flexibly mounted to platform 401 such as not to impede movement of platform 401.

FIG. 5 illustrates a cutaway view of a windshield wiper system 500 with translational actuation according to certain embodiments. Windshield wiper system 500 can be similar to windshield wiper system 400, but in a different state wherein platform 501 is positioned differently than platform 401. Windshield wiper system 500 is illustrated as including platform 501, which is in a spatial location enabling windshield wiper arm 506 to move through a planar field of motion across windshield 530. As illustrated, actuators 510 extend platform 501 away from structure 508. Applique 523 is illustrated as extending above windshield 530. Platform floor 504 is illustrated as being substantially parallel with windshield 530. With platform floor 504 being substantially parallel with windshield 530, wear on windshield wiper blade 512 caused from transitioning between platform floor 504 and windshield 530 surface can be reduced. For example, wear can be reduced when moving between positions 312 and 314 of FIG. 3.

Windshield wiper system 500 can include flip seal 520 that can be mechanically coupled to applique 523 or hood 502. Flip seal 521 can similarly be mechanically coupled to windshield 530 or applique 523. Flip seals 520 and 521 can be similar to flip seals 420 and 421, respectively. Windshield wiper system can include carrier 514, bond flanges 522, and primary seal 516 that can be similar to carrier 414, bond flanges 422, and primary seal 416, respectively.

Windshield wiper system 500 includes actuators 510 configured to move platform 501 in a field of motion 528 substantially perpendicular to windshield 530. Levels 524, 525, and 526 are illustrated as indicating various levels that linear actuators 510 can move platform floor 504 to be parallel with during operation of windshield wiper system 500. For example, platform 501 can be caused to retract into vehicle, similar to the illustrated state of windshield wiper system 400 in FIG. 4. When retracted, platform floor 504 can be parallel to level 526. When platform 501 is caused to extend to enable windshield wiper arm 506 to traverse windshield 530, platform 501 can be moved by actuators 510 to position platform floor 504 to be parallel with level 524 (above windshield 530). When platform floor 504 is at level 524, windshield wiper arm 506 can extend from platform floor 504. Actuators 510 can then move platform floor 504 to be at level 525 and substantially parallel with windshield 530. Although other levels are not illustrated, it should be understood that platform 501 can be moved between any position between the range of motion indicated by arrow 528. For example, platform floor 504 can be slightly retracted below level 525 to increase pressure of windshield wiper blade 512 on windshield 530. Likewise, platform floor 504 can be extended above level 530 to reduce the pressure applied by wiper blade 512.

Windshield wiper system 500 can include various features to improve aerodynamic properties of platform 501 when extended. For example, a front facia (not shown) can be provided to allow airflow to travel over applique 523 instead of into carrier 514. As another example or aerodynamic improving features, carrier 514 can include openings or other features to enable airflow to pass through carrier 514 such that airflow over a vehicle is impeded to a smaller degree.

Figure 6:
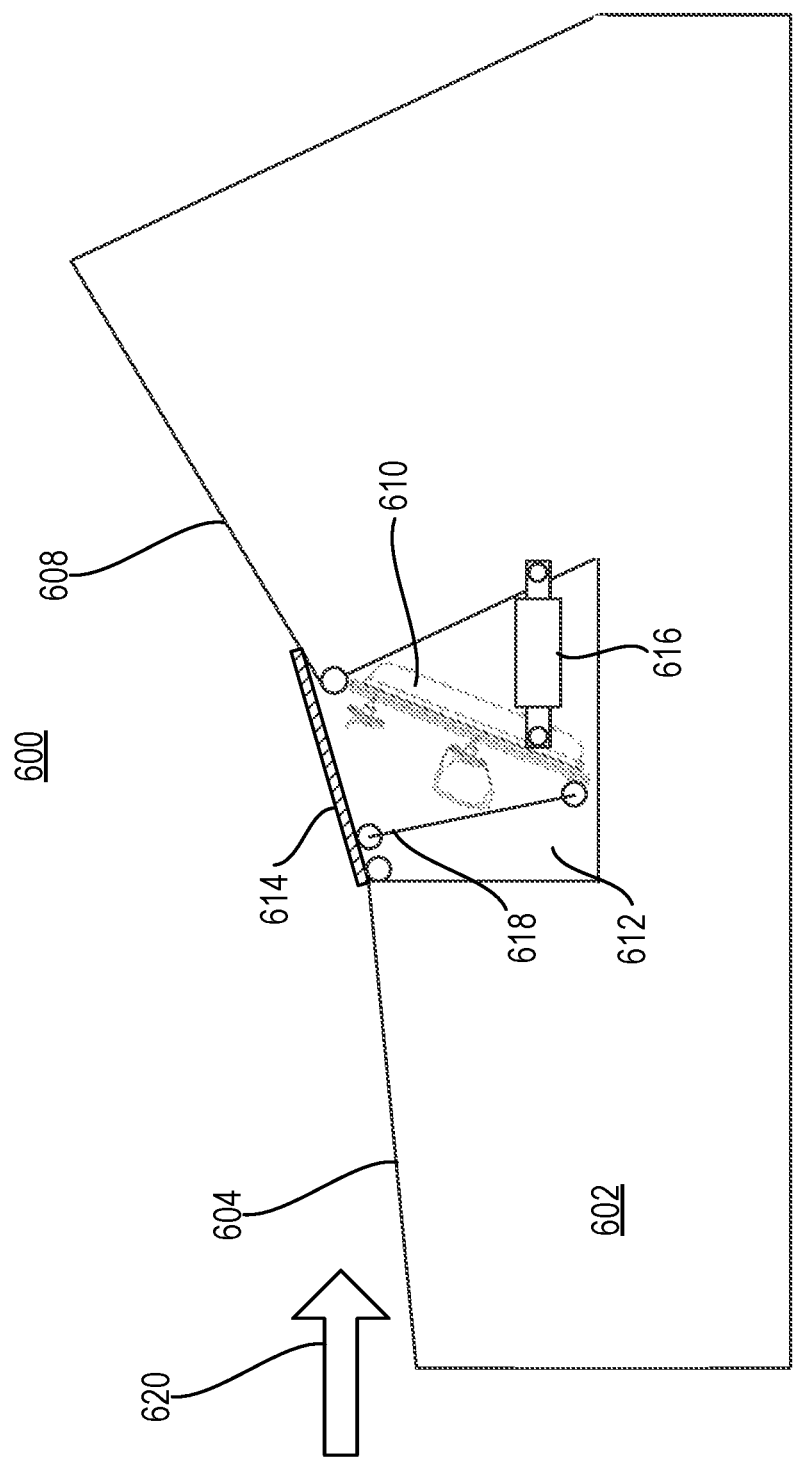
FIG. 6 illustrates a cutaway view of a retracted windshield wiper system with rotational actuation according to certain embodiments.
Figure 7:
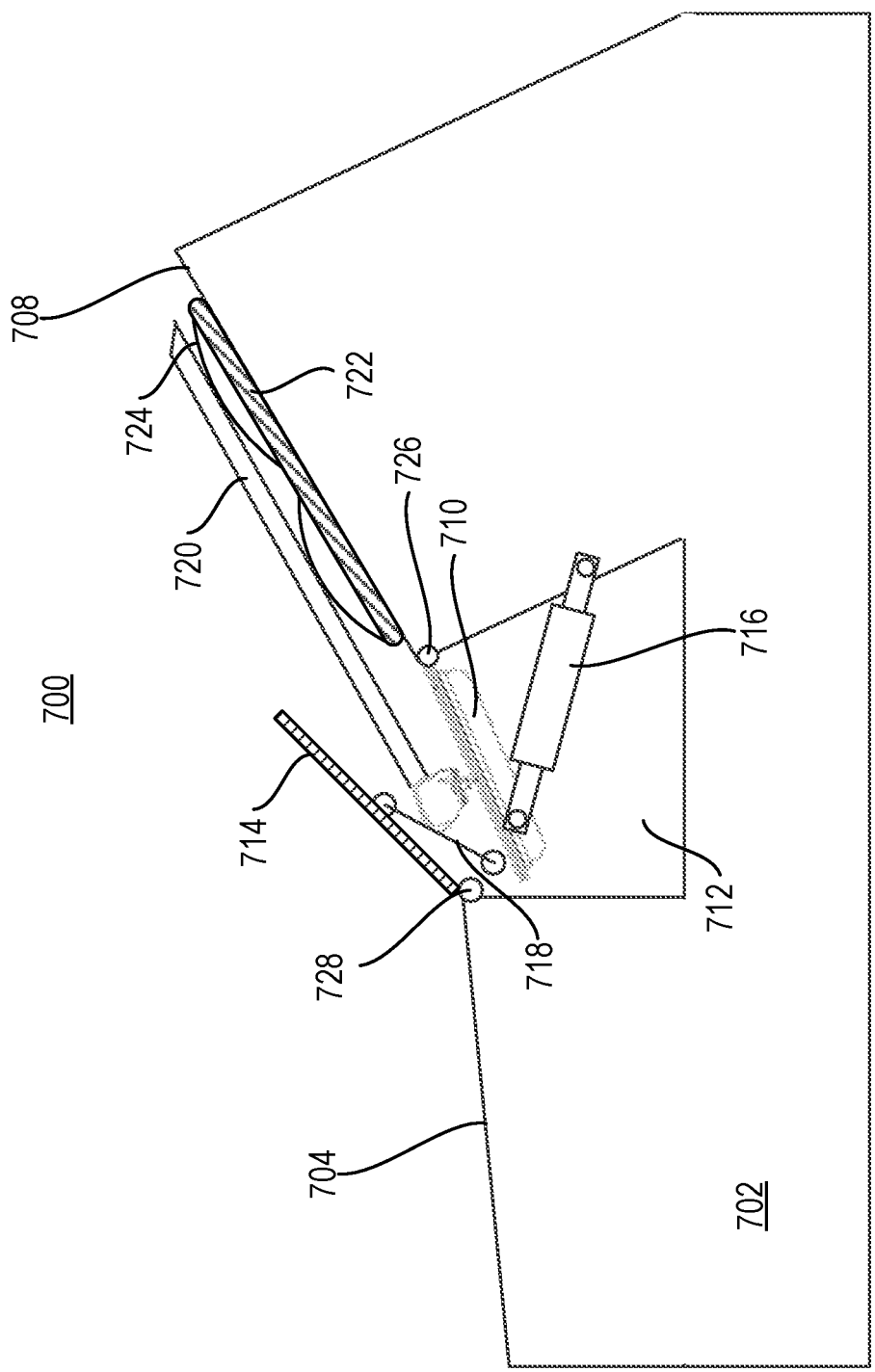
FIG. 7 illustrates a cutaway view of an extended windshield wiper system with rotational actuation according to certain embodiments.

FIGS. 6 and 7 illustrates two different states of respective windshield wiper systems 600 and 700 that can be moved via rotational actuation. Windshield wiper system 700 is illustrated as being extended to a spatial position to enable a windshield wiper arm to traverse a windshield. Windshield wiper system 600 is illustrated as being retracted such that a windshield wiper arm is constrained from moving across a windshield.

FIG. 6 illustrates a cutaway view of a windshield wiper system 600 with rotational actuation according to certain embodiments. Windshield wiper system 600 is illustrated as being retracted into cavity 612 of vehicle 602. Vehicle 602 includes a hood 604 and a windshield 608. Windshield wiper system 600 includes applique 614 that, as illustrated, substantially covers and conceals platform 610 from exterior view. Furthermore, airflow 620 across vehicle 602 can be minimally impacted by windshield wiper system 600, when retracted, thereby improving the aerodynamic performance of vehicle 602. For example, a drag coefficient of vehicle 602 can be substantially reduced/improved when windshield wiper system 600 is retracted, as illustrated.

Windshield wiper system 600 can include actuator 616 that can be configured to move platform 610 between various spatial locations. Actuator 616 can include a linear or other actuator that can be driven by hydraulic, electric, or pneumatic techniques. Applique 614 can be mechanically coupled to platform 610 via strut 618.

FIG. 7 illustrates a cutaway view of a windshield wiper system 700 with rotational actuation according to certain embodiments. Windshield wiper system 700 can be similar to windshield wiper system 600, but in an extended state wherein windshield wiper arm 720 is positioned to traverse windshield 708 via a planar range of motion. Windshield wiper system 700 includes platform 710 pivotally mounted 726 to vehicle 702. As illustrated, platform 710 is extended by linear actuator 716 to enabled windshield wiper arm 720 to traverse windshield 708. Also as illustrated, a floor of platform 710 is substantially parallel to windshield 708. Windshield wiper blade 722 is coupled to windshield wiper arm 720 via members 724. Members 724 can be configured to induce pressure exerted by windshield wiper blade 722 against windshield 708 to provide better fluid clearing performance and/or to account for convex or other shapes exterior surfaces of windshield 708.

Windshield wiper system 700 includes applique 714 that extends via the action of actuator 716. For example, applique 714 can be coupled to platform 710 via strut 718. Strut 718 can be pivotally mounted to applique 714 and platform 710. Applique 714 can be pivotally mounted 728 to hood 704 (or another vehicle 702 structure). When platform 710 is rotated into position by actuator 716, applique 714 can be moved into the position via the same actuation force. Furthermore, applique 714 can shield platform 710 from airflow travelling across hood 704.

Figure 8:
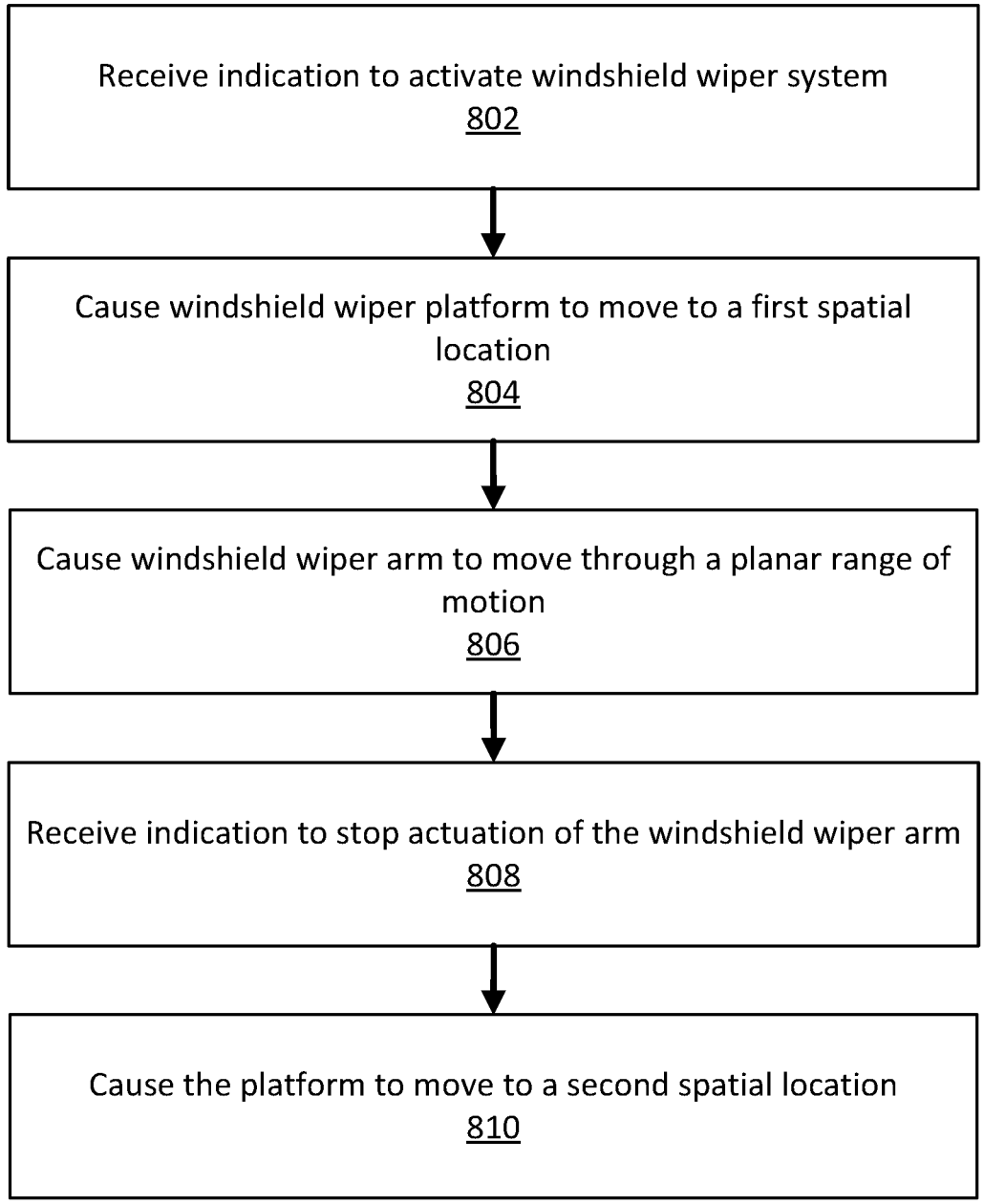
FIG. 8 illustrates an example flowchart for implementing features of certain embodiments.

FIG. 8 illustrates a flowchart 800 for operating a windshield wiper system according to certain embodiments. The techniques of flowchart 800 can be performed by a controller, for example. A controller can include a processor and/or memory storing computer readable instructions therein. The processor can execute the instructions to perform techniques disclosed herein. At 802, an indication can be received to activate a windshield. The indication to activate the windshield can be determined based on input from a sensor, such as sensor 206, by a command from a user, and/or through other means. For example, an indication can be received by the controller that a vehicle with a disclosed windshield wiper system is approaching inclement weather. At 804, in response to receiving the indication to activate the windshield, a windshield platform can be caused to extend to a first spatial location wherein a windshield wiper arm is operable to traverse a windshield. The platform can be moved via one or more actuators, as described herein.

It should be understood that benefits can be obtained by expeditiously causing the windshield platform to extend to the first spatial location to allow a windshield wiper system to clear matter from a windshield. If not expeditiously extended, a driver of a vehicle may be subjected to reduced visibility for a dangerous amount of time. In certain embodiments, a windshield wiper platform may be extended to the first spatial location within one second or a shorter time period. Similarly, actuators and structures of windshield wiper systems disclosed herein can be configured to enable expeditious movement of a windshield wiper platform. At 806, a windshield wiper arm can be moved through a planar range of motion across a windshield, or other surface of a vehicle. The speed, frequency, range of motion, and other attributes can be modified according to certain conditions. For example, input from sensor 206 can be utilized to determine a frequency at which the windshield wiper arm should move to clear the surface of matter. As another example, a user can manually select a frequency using cabin mounted controls.

At 808, an indication can be received to stop actuation of the windshield wiper arm. For example, input from sensor 206 can indicate that precipitation is no longer incident upon a windshield of a vehicle. As another example, user may indicate that use of the windshield wiper arm is no longer requested. After receiving such an indication, a delay may be implemented. At 810, the platform can be caused to move to a second spatial location wherein the windshield wiper arm is constrained from traversing a windshield or other surface of a vehicle. Prior to causing movement of the platform to the second spatial location, the windshield wiper arm may be caused to move to a position upon the platform. The optional delay can aid in instances wherein intermittent precipitation is incident upon a vehicle, avoiding excessive actuation of a platform between the first and second spatial locations.

FIG. 9 illustrates a flowchart 900 for operating a windshield wiper system according to certain embodiments. At 902 is a means for receiving an indication to active a windshield wiper system. This means can be a sensor, a manual input, a transceiver for receiving crowd sourced or other information, a controller coupled to any of the preceding, or other. At 904 is a means for causing a windshield platform to extend to a first spatial location wherein a windshield wiper arm of the windshield wiper system is operable to move through a planar range of motion across a windshield or other surface. The means can be a controller coupled to an actuator, for example. At 906 is a means for causing a windshield wiper arm to move through a planar range of motion, such as a controller coupled to a windshield wiper arm actuator.

At 908 is a means for receiving an indication to stop actuation of the windshield wiper arm. This means can be a sensor, a manual input, a transceiver for receiving crowd sourced or other information, a controller coupled to any of the preceding, or other. At 910 is a means for causing the platform to move to a second spatial location. The means can be a controller coupled to an actuator, for example.

Figure 10:
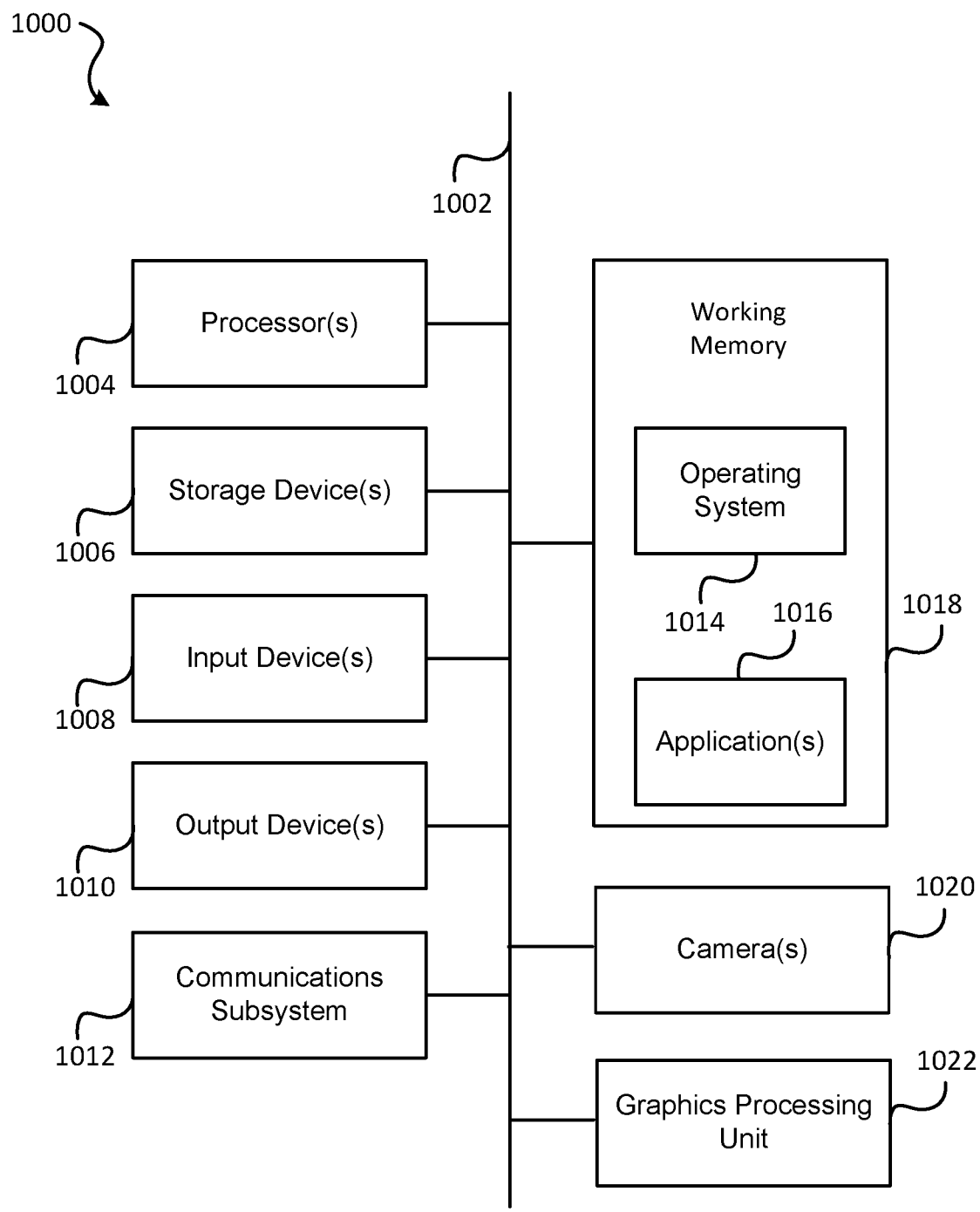
FIG. 10 illustrates an example computer system for implementing features of certain embodiments.

FIG. 10 illustrates an example computer system 1000 that can be used to implement features of the disclosure. Computer system 1000 is shown comprising hardware elements that can be electrically coupled via a bus 1002 (or may otherwise be in communication, as appropriate). The hardware elements may include one or more processors 1004, including without limitation one or more general-purpose processors and/or one or more special-purpose processors (such as digital signal processing chips, graphics processing units 1022, and/or the like); one or more input devices 1008, which can include without limitation one or more cameras, sensors, a mouse, a keyboard, a microphone configured to detect ultrasound or other sounds, and/or the like; and one or more output devices 1010, which can include without limitation a display unit such as the device used in implementations of the invention, a printer and/or the like. Additional cameras 1020 may be employed for detection of user's extremities and gestures. In some implementations, input devices 1008 may include one or more sensors such as infrared, depth, and/or ultrasound sensors. The graphics processing unit 1022 may be used to carry out the method for real-time wiping and replacement of objects described above.

In some implementations of the implementations of the invention, various input devices 1008 and output devices 1010 may be embedded into interfaces such as display devices, tables, floors, walls, and window screens. Furthermore, input devices 1008 and output devices 1010 coupled to the processors may form multi-dimensional tracking systems.

The computer system 1000 may further include (and/or be in communication with) one or more non-transitory storage devices 1006, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1000 might also include a communications subsystem 1012, which can include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 1012 may permit data to be exchanged with a network, other computer systems, and/or any other devices described herein. In many implementations, the computer system 1000 will further comprise a non-transitory working memory 1018, which can include a RAM or ROM device, as described above.

The computer system 1000 also can comprise software elements, shown as being currently located within the working memory 1018, including an operating system 1014, device drivers, executable libraries, and/or other code, such as one or more application programs 1016, which may comprise computer programs provided by various implementations, and/or may be designed to implement methods, and/or configure systems, provided by other implementations, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1006 described above. In some cases, the storage medium might be incorporated within a computer system, such as computer system 1000. In other implementations, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which may be executable by the computer system 1000 and/or might take the form of source and/or installable code, which, upon compilation and/or installation on the computer system 1000 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some implementations, one or more elements of the computer system 1000 may be omitted or may be implemented separate from the illustrated system. For example, the processor 1004 and/or other elements may be implemented separate from the input device 1008. In one implementation, the processor may be configured to receive images from one or more cameras that are separately implemented. In some implementations, elements in addition to those illustrated in FIG. 4 may be included in the computer system 1000.

Some implementations may employ a computer system (such as the computer system 1000) to perform methods in accordance with the disclosure. For example, some or all of the procedures of the described methods may be performed by the computer system 1000 in response to processor 1004 executing one or more sequences of one or more instructions (which might be incorporated into the operating system 1014 and/or other code, such as an application program 1016) contained in the working memory 1018. Such instructions may be read into the working memory 1018 from another computer-readable medium, such as one or more of the storage device(s) 1006. Merely by way of example, execution of the sequences of instructions contained in the working memory 1018 might cause the processor(s) 1004 to perform one or more procedures of the methods described herein.

The terms "machine-readable medium" and "computer-readable medium," as used herein, refer to any medium that participates in providing data that causes a machine to operate in a specific fashion. In some implementations implemented using the computer system 1000, various computer-readable media might be involved in providing instructions/code to processor(s) 1004 for execution and/or might be used to store and/or carry such instructions/code (e.g., as signals). In many implementations, a computer-readable medium may be a physical and/or tangible storage medium. Such a medium may take many forms, including but not limited to, non-volatile media, volatile media, and transmission media. Non-volatile media include, for example, optical and/or magnetic disks, such as the storage device(s) 1006. Volatile media include, without limitation, dynamic memory, such as the working memory 1018. Transmission media include, without limitation, coaxial cables, copper wire and fiber optics, including the wires that comprise the bus 1002, as well as the various components of the communications subsystem 1012 (and/or the media by which the communications subsystem 1012 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1004 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000. These signals, which might be in the form of electromagnetic signals, acoustic signals, optical signals and/or the like, are all examples of carrier waves on which instructions can be encoded, in accordance with various implementations of the invention.

The communications subsystem 1012 (and/or components thereof) generally will receive the signals, and the bus 1002 then might carry the signals (and/or the data, instructions, etc. carried by the signals) to the working memory 1018, from which the processor(s) 1004 retrieves and executes the instructions. The instructions received by the working memory 1018 may optionally be stored on a non-transitory storage device either before or after execution by the processor(s) 1004.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Moreover, nothing disclosed herein is intended to be dedicated to the public.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The foregoing description of various examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A windshield wiper system, comprising:
a controller;
a movable windshield wiper arm;
a platform mechanically coupled to the movable windshield wiper arm; and
an actuator mechanically coupled to the platform, the actuator configured to move both of the platform and the movable windshield wiper arm relative to a vehicle on which the windshield wiper system is installed,
wherein the movable windshield wiper arm is configured to move through a planar range of motion that is substantially parallel to a surface of the vehicle when the platform is positioned at a first spatial location by the actuator, and the movable windshield wiper arm is further configured to be constrained from moving through the planar range of motion when the platform is positioned at a second spatial location by the actuator, the second spatial location differing from the first spatial location;
wherein the controller is configured to cause the actuator to move the platform to the first spatial location, the second spatial location, or a third spatial location, the third spatial location being different from the first and second spatial locations;
wherein the platform comprises a platform floor, wherein the platform floor is substantially flush with the surface when the platform is positioned at the first spatial location; and
wherein the platform floor is below the surface when the platform is positioned at the second spatial location, and the platform floor is above the surface when the platform is positioned at the third spatial location.

2. The windshield wiper system of claim 1, wherein the platform comprises a platform floor and an applique, wherein the movable windshield wiper arm is spatially disposed substantially between the platform floor and the applique.

3. The windshield wiper system of claim 1, further comprising a windshield wiper motor mechanically coupled to the movable windshield wiper arm, the windshield wiper motor configured to drive the movable windshield wiper arm to move through the planar range of motion.

4. The windshield wiper system of claim 1, wherein the actuator is configured to move the platform in a substantially translational motion between the first spatial location and the second spatial location.

5. The windshield wiper system of claim 1, wherein the actuator is configured to move the platform in a substantially rotational motion between the first spatial location and the second spatial location.

6. The windshield wiper system of claim 1, further comprising: a first sensor, the first sensor operable to detect whether the platform is positioned at the first spatial location.

7. The windshield wiper system of claim 1,
wherein the controller is configured to:
cause the movable windshield wiper arm to move to a first position in the planar range of motion from a second position on the platform;
cause the movable windshield wiper arm to move through the planar range of motion from the first position, to a third position in the planar range of motion, and back to the first position; and
cause the movable windshield wiper arm to move to the second position on the platform.

8. The windshield wiper system of claim 7, wherein:
Prior to causing the movable windshield wiper arm to move to the first position in the planar range of motion from the second position on the platform, the controller is configured to move the platform to the third spatial location; and
Prior to causing the movable windshield wiper arm to move through the planar range of motion from the first position to the third position in the planar range of motion and back to the first position, the controller is configured to move the platform to the second spatial location.

9. The windshield wiper system of claim 8, wherein, prior to causing the movable windshield wiper arm to move to the second position on the platform, the controller is configured to move the platform to the third spatial location.

10. The windshield wiper system of claim 1, further comprising: a second sensor configured to determine precipitation incident upon the surface; wherein the controller is coupled to the second sensor and configured to cause the actuator to move the platform to the first spatial location from the second spatial location upon determining that the precipitation is incident upon the surface.

11. A device, comprising:
a means for moving a platform between a first spatial location, a second spatial location, and a third spatial location,
a windshield wiper arm mechanically coupled to the platform to move concurrently with the platform, wherein a portion of the platform forms a portion of the exterior of a vehicle when the platform is positioned at the second spatial location,
wherein the windshield wiper arm is configured to move through a planar range of motion that is substantially parallel to a windshield of the vehicle, including a first position on the windshield, a second position on the platform, and a third position on the windshield, wherein the windshield wiper arm is configured to move from the second position to the first position when the platform is positioned at the third spatial location by the means to move the platform, and the windshield wiper arm is configured to move from the first position, to the third position, and back to the first position when the platform is positioned at the first spatial location by the means to move the platform.

12. The device of claim 11, wherein the portion of the platform forming a portion of the exterior of the vehicle is flush with an adjacent exterior portion of the vehicle when the platform is positioned at the second spatial location.

13. The device of claim 12, wherein the portion of the platform forming a portion of the exterior of the vehicle that is flush with an adjacent exterior portion of the vehicle is a portion of a windshield of the vehicle.

14. The device of claim 11, wherein a drag coefficient of the vehicle is reduced when the platform is positioned at the second spatial location and the drag coefficient of the vehicle is increased when the platform is positioned at the first spatial location.

15. The device of claim 14, wherein the draft coefficient is measured correlating to airflow incident from a direction indicated by the front of the vehicle.

16. The device of claim 11, wherein the means for moving the platform is configured to move the platform between the first spatial location and the second spatial location within one second.

* * * * *